United States Patent [19]
Massar

[11] Patent Number: 5,153,718
[45] Date of Patent: Oct. 6, 1992

[54] CUTTING APPARATUS WITH VIEWER

[76] Inventor: Jack Massar, 6376 Massey Hill N., Memphis, Tenn. 38120

[21] Appl. No.: 614,298

[22] Filed: Nov. 16, 1990

[51] Int. Cl.[5] ............................................. H06N 7/18
[52] U.S. Cl. .................................... 358/100; 166/55.2
[58] Field of Search ....................... 358/100, 101, 901; 166/297, 298, 55.1, 55.2, 55, 65.1, 66, 255; 356/241

[56] References Cited

U.S. PATENT DOCUMENTS

| | | | |
|---|---|---|---|
| 3,080,269 | 3/1963 | Pollock et al. | 156/87 |
| 3,761,623 | 9/1973 | Hara et al. | 358/100 |
| 3,943,410 | 3/1976 | Kalberer, Jr. et al. | 358/100 |
| 3,950,461 | 4/1976 | Levens | 264/46.5 |
| 4,197,908 | 4/1980 | Davis et al. | 166/55 |
| 4,442,891 | 4/1984 | Wood | 166/55.2 |
| 4,577,388 | 3/1986 | Wood | 166/55 |
| 4,616,258 | 10/1986 | Ono et al. | 358/100 |
| 4,651,558 | 3/1987 | Martin et al. | 73/40.5 R |
| 4,675,728 | 6/1987 | Gger et al. | 358/100 |
| 4,677,472 | 6/1987 | Wood | 358/100 |
| 4,701,988 | 10/1987 | Wood | 166/55.2 |
| 4,728,974 | 3/1988 | Nio et al. | 358/901 |
| 4,867,921 | 9/1989 | Steketee, Jr. | 264/36 |
| 4,918,517 | 4/1990 | Burgoon | 358/101 |
| 4,951,758 | 8/1990 | Sonker et al. | 166/55.2 |

*Primary Examiner*—John K. Peng
*Attorney, Agent, or Firm*—James & Franklin

[57] ABSTRACT

Close observation of the controlled cutting action of a cutter operating at a remote location is achieved by providing a viewing means having a viewing part such as the optically exposed end of a fiberoptic filament positioned close to and movable with the cutting element, that viewing part being operatively connected to means at a remote station for making intelligible that which is viewed thereby. Preferably the viewing part is physically connected to the cutting element so as to be movable therewith, and the operative connection between the viewing part and the remote station comprises a TV camera and associated equipment.

12 Claims, 2 Drawing Sheets

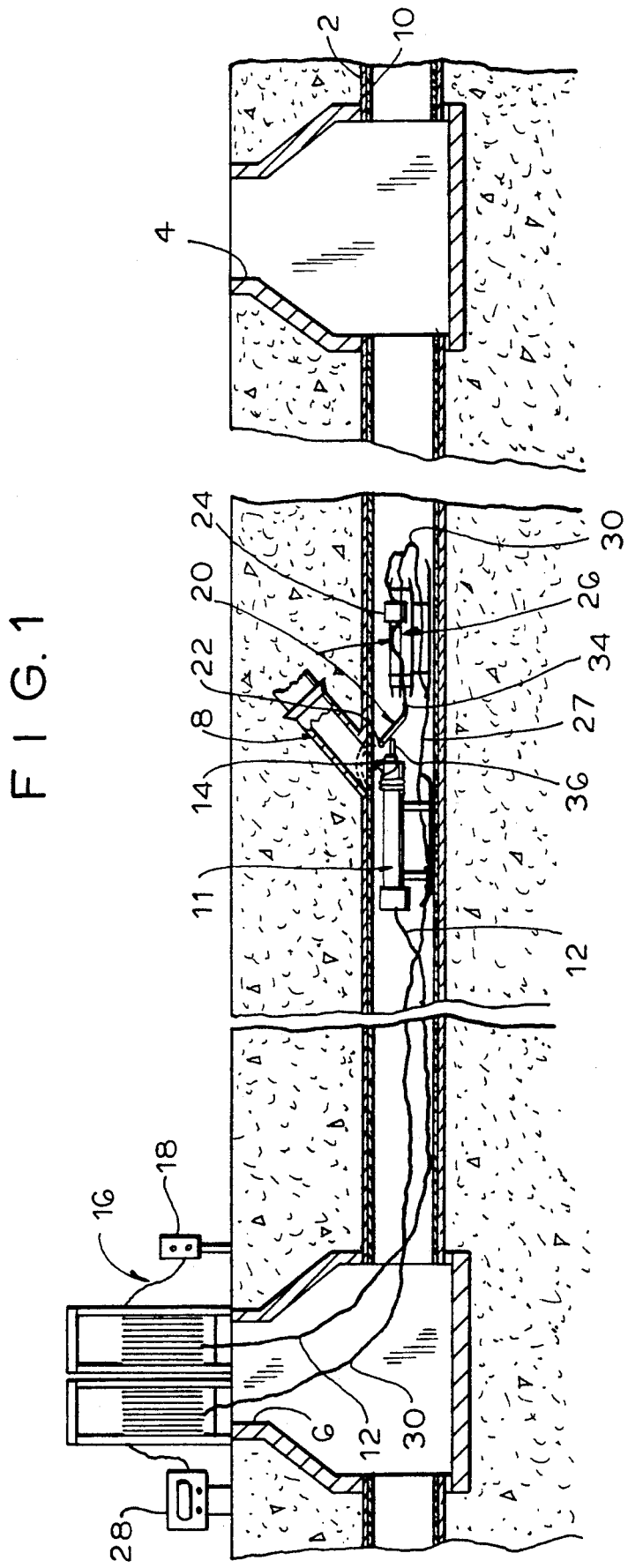

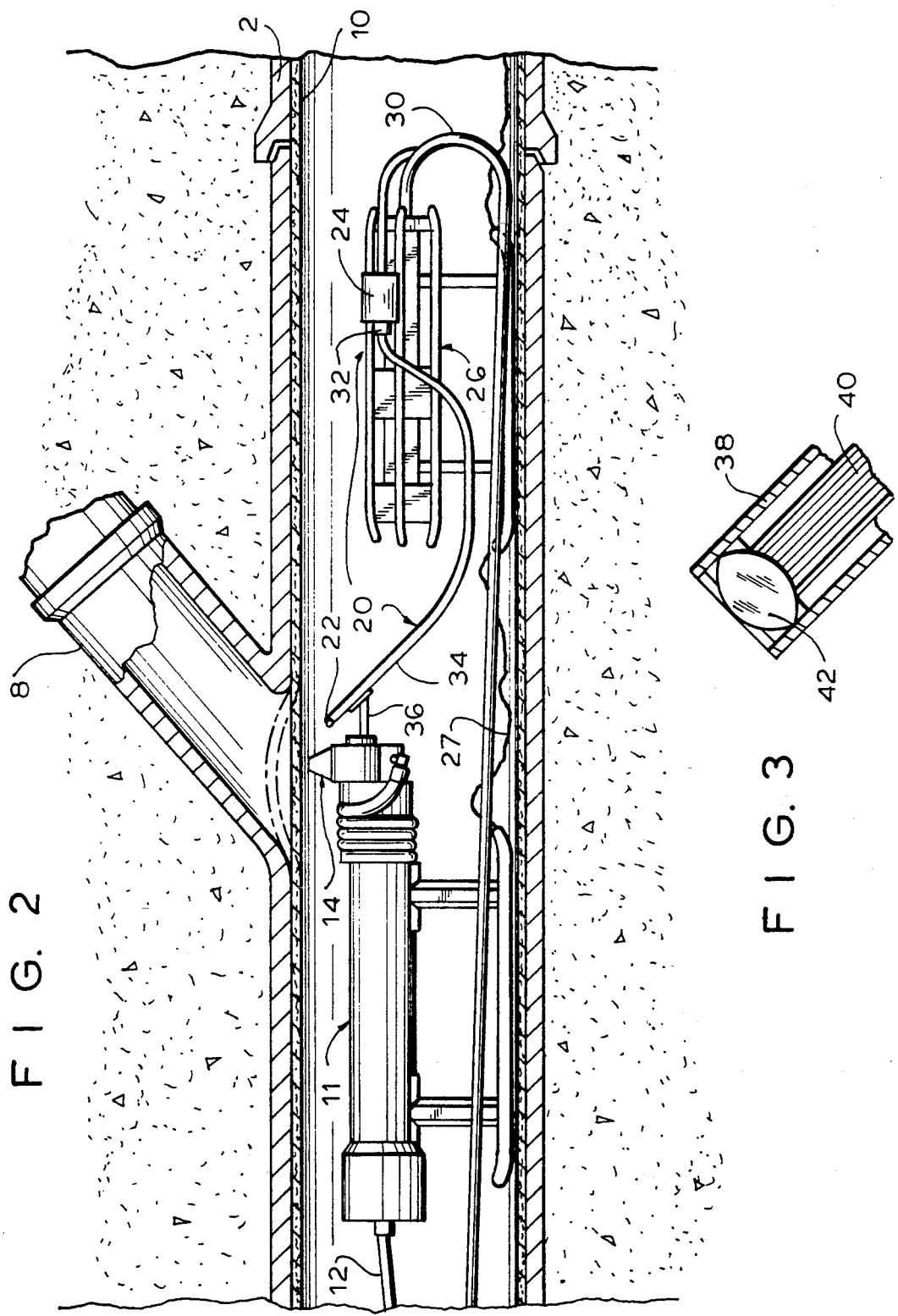

CUTTING APPARATUS WITH VIEWER

BACKGROUND OF THE INVENTION

The present invention relates to the combination of a cutting apparatus designed to be operated at a remote location and means associated therewith for enabling an operator at a remote station to view and monitor the cutting operation in an optimum fashion. The invention is particularly designed to view and monitor the cutting of linings applied to conduits such as sewer pipes in order to provide access to conduits extending laterally therefrom.

As part of the rehabilitation of underground pipes and the like, such as sewer pipes, it is customary to provide a continuous lining along a given length of the pipe. The pipe will customarily have laterals extending therefrom, for example, to connect a sewer to users such as residences along the route of the pipe. The lining as initially applied usually covers those laterals and hence prevents communication therewith, which is inadmissible. The lining must therefore be removed from the opening to the lateral so that fluid communication with the lateral is restored. Since the opening to the lateral is remote from a main end of the pipe and since in many instances human access to the interior of the pipe is in any event impossible or extremely inconvenient, the cutting operation must be controlled from a remote station. Apparatus for performing such a cutting operation in such an environment is known, and typical embodiments thereof are shown in such patents as Davis et al. 4,197,908 of Apr. 15, 1980 entitled "Apparatus For Porting a Side Wall of a Conduit From Interiorly Thereof", Wood patent 4,442,891 of Apr. 17, 1984 entitled "Cutters", Wood patent 4,577,388 of Mar. 25, 1986 entitled "Method of Cutting Apertures in Lining in Underground Pipes", and Wood patent 4,701,988 of Oct. 27, 1987 entitled "Relating to Cutters". As will be seen from those representative patents, the cutters comprise a cutting element which can be moved into a pipe to the position where cutting is to be performed, after which the cutting element is actuated and moved to carry out the desired cutting operation. A television camera is also moved through the pipe along with the cutter, and that which it sees is conveyed electronically to a remote station where the movement of the cutting element is controlled. The TV camera is usually located along the axis of the main pipe at a distance of about two feet from the cutter and is stationary while the cutting element is moving to commence and carry out the cutting operation. Hence the view of the cutting operation that the operator at the remote station gets is far from optimum, and does not permit truly close manual control of the cutting operation.

It has been proposed in the past to provide a mirror designed to reflect the viewed action of the cutting element to a TV camera, but it has proved difficult to achieve an effective continuous view with such a mirror, and one advantage of the present invention is that it provides better continuous viewing with lower mass and mechanical inertia and occupying less space than the prior art mirrors.

The problem of cutting openings to laterals in the environment under discussion is complicated by the fact that the shape of the piece to be cut from the liner is neither a circle nor an ellipse, but is the intersection of two cylinders whose axes do not necessarily intersect and whose axes are not necessarily at right angles to each other. Because of the nature of this shape, the use of a fixed TV camera to monitor the cutting often gives a distorted view of the shape of the opening that must be cut from the liner.

OBJECTS AND SUMMARY OF THE INVENTION

The prime object of the present invention is to provide, in a cutting operation of the type under discussion, a close-up, greatly improved and truly optimal view of the cutting operation, so that control thereof from a remote station is greatly enhanced.

It is a further object of the present invention to devise a cutter-viewer combination where the cutter includes a cutting element which is movable relative to the cutter support to carry out the cutting operation and where the viewing part or "eye" of the viewing means is always optimally positioned to view the cutting operation.

In accordance with the present invention, the means for viewing the cutting operation comprises a viewing part or "eye" which is not only located close to and directed toward the cutting element but which is also operatively connected to that element so as to move therewith. Its location and orientation with respect to the cutting element are chosen so that the desired view of the cutting operation is achieved, and that desired view will continue throughout the cutting operation even though the cutting element must necessarily move to carry out the cutting operation. The viewing part or "eye" may comprise a TV camera small enough and light enough so that its connection to and movement with the cutting element will not impede the action and easy controllability of that element, but in its preferred form the "eye" is constituted by the optically exposed end of a fiberoptic filament or, more usually, a bundle of such filaments defining a coherent fiberoptic element. That "eye" will be aimed at, or in the vicinity of, the area where the cutter is cutting through the lining and will transmit an image of this area to the remote control station, either by virtue of optical transmission along the length of a fiberoptic element which extends all the way to the remote station or, preferably, to a TV camera located in the vicinity of the cutting operation, which camera is connected by an elongated video cable to the aboveground video monitor at the remote station. The operator controlling the location and motion of the cutting element from the remote station views the thus-produced image on his TV monitor and is thereby enabled to cut the pipe lining with greater ease, speed, precision and accuracy than has been possible heretofore. The "eye" can be located very close to the cutting edge of the cutting element and can be directed toward that cutting edge at an angle that provides optimum viewing and information.

In systems of the type under discussion means are usually provided for illuminating the interior of the pipe, and in particular the area where cutting takes place, so that the cutting operation can be clearly seen. Another advantage of the fiberoptic embodiment of the present invention is that such illumination can be effectively and efficiently provided by another fiberoptic cable illuminated at its remote end and conducting that illumination to the very area where cutting takes place. This has the advantage of producing brighter illumination at the particular location desired without casting shadows on the cutting area by components of the cutting apparatus. The illuminating fiberoptic cable, like the viewing fiberoptic cable, can be bent and positioned so as not to interfere with any of the components of the cutting apparatus or the motions thereof.

A lens or lens system can be attached to the exposed ends of the imaging fiberoptic bundle and the illuminating fiberoptic bundle, with the focal length and included angle of view of the lens systems being selected for optimum resolution and viewing. The illumination aspect of the present invention is optional, and the viewing aspect thereof can be used with or without the illumination aspect thereof.

BRIEF DESCRIPTION OF THE DRAWINGS

To the accomplishment of the above and to such other objects as may hereinafter appear, the present invention relates to the combination of a cutting apparatus designed to operate at a remote location and means for viewing the cutting operation, as defined in the appended claims and as described in this specification, taken together with the accompanying drawings, in which:

FIG. 1 is a cross-sectional view of an idealized lined pipe with one embodiment of the cutting and viewing apparatus of the present invention positioned for the cutting of the lining to provide fluid communication to a lateral pipe;

FIG. 2 is a similar view, but on an enlarged scale, of the pipe location from which the lateral extends; and FIG. 3 is a cross-sectional view on an enlarged scale of the exposed end of a typical fiberoptic viewing means.

DESCRIPTION OF THE PREFERRED EMBODIMENT

The drawings illustrate a typical environment for the practice of the present invention. A sewer pipe or other conduit 2 extends underground between access openings or manholes 4 and 6. At some point between those two manholes a lateral pipe connection 8 extends from the pipe 2 to some other location, such as a dwelling. For one reason or another a lining 10 has been put in place within the pipe 2 between the access openings 4 and 6. The particular form of that lining is not significant insofar as the present invention is concerned. It may be a hardened-in-situ pipe-within-a-pipe such as is disclosed in Wood patent 4,009,063 of Feb. 22, 1977 entitled "Method of Lining a Pipe" and Wood patent 4,064,211 of Dec. 20, 1977 entitled "Lining of Passageways", it may be a so-called hose lining, a flexible lining which is adhesively secured to the inner surface of the pipe 2, it may be a slip lining, or it may take any one of a number of other forms, but what is significant from the point of view of the present invention is that it extends substantially continuously between the access openings 4 and 6 and thus covers the opening to the lateral 8, preventing fluid communication between that lateral 8 and the pipe 2. It is necessary that that portion of the lining which actually obstructs fluid communication between the pipe 2 and the lateral 8 be removed, and it is for that purpose that the remotely operated cutters previously referred to are used. They are remotely controlled because in most instances it is either impossible, impractical or undesirable for an individual to move within the pipe 2 to the appropriate location.

To that end, and as is well known in the art, a sled or other support generally designated 11 is provided which can be introduced into the pipe 2 via manhole 4 and then pulled through the pipe 2 to the place where cutting is to take place, as by means of the cable 12 attached thereto, and which carries a power-driven cutting element generally designated 14 which can be controlled from a remote aboveground station 16 in well known manner by means of the control mechanism generally designated 18 electrically connected to the cutting element 14.

The standby position of the cutting element 14 with respect to the support 11 is a withdrawn position such that the support 11 with the cutting element 14 thereon can be pulled through the pipe 2 without interference. When the support 11 has been so positioned within the pipe 2 as to bring the cutting element 14 into registration with the covered end of the lateral 8, the operator will cause the cutting element 14 to be projected outwardly into engagement with that portion of the lining 10 which covers the opening to the lateral 8 and to become power-driven to cut and to move as it cuts so as to cut away all or substantially all of the lining 10 which obstructs access to the lateral 8, as indicated by the broken lines in FIG. 2. In order to do this the operator must know where the cutting element 14 is at all times, and it is for that reason that apparatus of the type under discussion is provided with a viewing means, typically in the prior art a TV camera either mounted on the support 11 or on a separate support 11' so as to move along the pipe with the support 11 as the latter is moved to its cutting position. However, in the prior art that viewing means has been stationary while the cutting element 14 moves relative to its support 11 and hence its field of view must be such as to encompass the entire ambit of movement of the cutting element 14 relative to the support 11 on which it is mounted. The disadvantages of this arrangement have been pointed out above.

In accordance with the present invention, a viewing means generally designated 20 is provided which has a viewing part or "eye" 22 which is not only located quite close to the cutting element 14, much closer than has been the case in prior art systems, but is also movable with the cutting element 14 as the latter is moved relative to its support 11 to perform the cutting operation, thus providing not only a better and more precise view of the cutting operation but also one which is directed precisely at the point of interest, to wit, the specific place where, at any given moment, cutting is taking place.

In the embodiment here specifically disclosed, the viewing means 20 comprises a TV camera 24 located on a second sled-like support 26 slidable through the pipe 2 along with the support 11, as by being connected thereto by line 27. The TV camera 24 is in electrical communication with a TV monitor 28 at the remote station 16 via a cable 30. The camera 24 does not directly view the cutting operation. Instead, in accordance with the present invention, the optical input 32 to the camera 24 is defined by an elongated and preferably flexible optical transmitting means 34 such as a fiberoptic cable defined by one or more fiberoptic filaments. The free end of that cable 34 is physically connected to the cutting element 14, as by means of bracket 36, so as to be movable with that cutting element 14 as it moves relative to its support 11 when it cuts. The exposed end 22 of the fiberoptic cable 34 constitutes the viewing part or "eye" of the viewing means, and the cable 34 is so mounted on the cutting element 14 that the said end 22 is positioned very close to, and oriented directly toward, the point where the cutting takes place. In a typical embodiment the spacing between the end 22 of the viewing means and the cutting portion of the cutting means 14 may be only an inch or two, while the camera 24 may be located at a considerably greater distance therefrom, perhaps on the order of feet. It is considered desirable to minimize the length of the fiberoptic cable 34 for mechanical and optical reasons, but the distance involved is not at all critical.

It will be understood that it may be possible to dispense entirely with the camera 24 by causing the fiberoptic cable 34 to extend through the pipe 2 and up to the viewing station 16, there to have its viewed image made intelligible in any known fashion, but it is at present believed that the use of a TV camera as part of the means transmitting that which is viewed by the "eye" 22 to the monitor 28 is preferable.

It is also possible within the scope of the present invention to mount a particularly small and light TV camera 24 directly on the cutting element 14 by means of the bracket 36, but the use of a fiberoptic cable is preferred because its size and lightness is such as to affect the movement of the cutting element 14 only minimally.

As illustrated in FIG. 3, the fiberoptic cable 34 may comprise an outer covering 38 within which a bundle 40 of fiberoptic filaments is provided, with the ends of those filaments being physically and optically connected to a lens 42 designed to produce the desired focus and area of view.

It is usually necessary to provide means for illuminating the interior of the pipe 2 so that the operator can see what is going on. In accordance with the present invention the TV camera housing 24 can include a light source of any desired type optically connected to the "eye" 22 by fiberoptic means, either a separate fiberoptic cable 34 or a fiberoptic line contained within the covering 38, in either case preferably having its light-emitting end oriented corresponding to and movable with the "eye" 22 of the viewing means. However, the viewing fiberoptic means can be used without an illuminating fiberoptic means, in which case illumination will be provided by a lamp or lamps of the type heretofore customarily used.

More than one viewing fiberoptic means, and more than one illuminating fiberoptic means, can be mounted on the cutting means 14 to provide better viewing and/or better illumination. The use of a plurality of differently located and oriented viewing means not only provides detailed viewing movable with the cutting means 14 over a greater area, but also can, if properly imaged at the remote station 16, provide a three-dimensional view of the operation.

While but a single embodiment of the present invention has been here specifically disclosed, it will be apparent that many variations may be made therein, all within the scope of the invention as defined in the following claims.

I claim:

1. In the combination of a cutting apparatus designed to operate at a remote location comprising a support movable along a surface to a cutting position and a power-driven cutting element operatively mounted on said support for movement relative to said support from an inoperative position through a series of cutting positions and means movable along said surface for viewing the cutting operation, the improvement which comprises said viewing means comprising a viewing part and a transmitting part, said viewing means being operatively connected to said cutting element so that said viewing part is closely spaced relative to, is pointed toward, and is essentially movable with said cutting element as the latter thus moves relative to said support, and mans operatively connected to said transmitting part for making intelligible at a remote station that which is viewed by said viewing part.

2. The combination of claim 1 in which said viewing part is physically carried by said cutting element.

3. The combination of either of claims 1 or 2, in which said viewing means comprises a support movable along said surface, said transmitting part being mounted on said viewing means support.

4. In the combination of claim 3, an operative connection between said cutting apparatus support and said viewing means support for causing substantially simultaneous movement of said two supports.

5. The combination of either of claims 1 or 2, in which said viewing means comprises a fiberoptic element operatively connected between said viewing part and said transmitting part.

6. In the combination of claim 5, a fiberoptic illuminating means generally paralleling said viewing means fiberoptic element, said fiberoptic illuminating means having a light-emitting part adjacent to and essentially movable with said viewing part of said viewing means.

7. The combination of claim 6, in which said viewing means comprises a support movable along said surface, said transmitting part being mounted on said viewing means support.

8. In the combination of claim 7, an operative connection between said cutting apparatus support and said viewing means support for causing substantially simultaneous movement of said two supports.

9. The combination of claim 5, in which said fiberoptic element is located on said support, and camera means on said support, operatively connected to said transmitting part, and operatively connected to said remote station, thereby to make intelligible to said remote station that which is viewed by said viewing part.

10. In the combination of claim 9, an operative connection between said cutting apparatus support and said viewing means support for causing substantially simultaneous movement of said two supports.

11. In the combination of claim 10, fiberoptic illuminating means generally paralleling said viewing means fiberoptic element, said fiberoptic illuminating means having a light-emitting part adjacent to and essentially movable with said viewing part of said viewing means fiberoptic element.

12. In the combination of claim 9, fiberoptic illuminating means generally paralleling said viewing means fiberoptic element, said fiberoptic illuminating means having a light-emitting part adjacent to and essentially movable with said viewing part of said viewing means fiberoptic element.

* * * * *